United States Patent
Hirpara et al.

(10) Patent No.: US 11,276,258 B2
(45) Date of Patent: Mar. 15, 2022

(54) ENHANCED SECURITY FOR CONTACTLESS ACCESS CARD SYSTEM

(71) Applicant: Delphian Systems, LLC, Buffalo Grove, IL (US)

(72) Inventors: Ashok Hirpara, Carol Stream, IL (US); Arkadiusz Zimny, Hampshire, IL (US)

(73) Assignee: Delphian Systems, LLC, Buffalo Grove, IL (US)

( * ) Notice: Subject to any disclaimer, the term of this patent is extended or adjusted under 35 U.S.C. 154(b) by 0 days.

(21) Appl. No.: 16/901,582

(22) Filed: Jun. 15, 2020

(65) Prior Publication Data

US 2021/0390805 A1    Dec. 16, 2021

(51) Int. Cl.
*G07C 9/00* (2020.01)
*G06K 19/073* (2006.01)

(52) U.S. Cl.
CPC ... *G07C 9/00309* (2013.01); *G06K 19/07309* (2013.01); *G07C 9/00571* (2013.01); *G07C 9/00944* (2013.01); *G07C 2009/00412* (2013.01); *G07C 2009/00523* (2013.01); *G07C 2009/00976* (2013.01)

(58) Field of Classification Search
CPC ............ G07C 9/00309; G07C 9/00944; G07C 9/00571; G07C 2009/00412; G07C 2009/00976; G07C 2009/00523; G06K 19/073; G06K 19/07309; G06F 3/06; G06F 3/062; G06F 3/0622; G06F 3/0623
USPC ...................................................... 340/5.61
See application file for complete search history.

(56) References Cited

U.S. PATENT DOCUMENTS

| | | | |
|---|---|---|---|
| 5,467,081 A | * | 11/1995 | Drews .................. G06K 7/0008 340/10.51 |
| 6,567,915 B1 | | 5/2003 | Guthery |
| 6,925,182 B1 | | 8/2005 | Epstein |
| 7,711,120 B2 | | 5/2010 | Kimmel et al. |
| 7,826,614 B1 | | 11/2010 | Kaniz et al. |

(Continued)

FOREIGN PATENT DOCUMENTS

| EP | 3327679 A1 | 5/2018 |
|---|---|---|
| JP | 2003-343133 A | 12/2003 |

OTHER PUBLICATIONS

"MIFARE." Wikipedia. Obtained from [https://en.wikipedia.org/wiki/MIFARE] on May 22, 2020.

(Continued)

*Primary Examiner* — Edwin C Holloway, III
(74) *Attorney, Agent, or Firm* — Banner & Witcoff, Ltd.

(57) ABSTRACT

An access card may store an encrypted operation key and a key used to read the encrypted operation key from the access card. The encrypted operation key and the key may be based on a unique identifier (UID) of the access card. The encrypted operation key may be obtained by encrypting an operation key using a cryptographic key that is also based on the UID of the access card. An access card reader may read the UID from the access card and use it to generate the key used to read the encrypted operation key from the access card. The access card read may also use the UID read from the access card to generate a cryptographic key used to decrypt the encrypted operation key. The access card reader may validate the decrypted operation key and determine whether to grant or deny access, for example, via an access control device.

49 Claims, 6 Drawing Sheets

(56) References Cited

U.S. PATENT DOCUMENTS

| | | | |
|---|---|---|---|
| 8,751,819 B1* | 6/2014 | Langsworth | H04L 9/0637 713/189 |
| 8,788,803 B2 | 7/2014 | Irvine | |
| 9,077,716 B2 | 7/2015 | Myers et al. | |
| 9,286,481 B2 | 3/2016 | Ghosh | |
| 9,317,449 B2 | 4/2016 | Ducharme et al. | |
| 9,336,633 B2 | 5/2016 | Radicella et al. | |
| 9,379,891 B2 | 6/2016 | Yoon et al. | |
| 9,407,624 B1 | 8/2016 | Myers et al. | |
| 9,580,931 B2 | 2/2017 | Myers et al. | |
| 9,781,599 B2 | 10/2017 | Myers et al. | |
| 9,940,768 B2 | 4/2018 | Carstens et al. | |
| 10,529,156 B2 | 1/2020 | Myers et al. | |
| 2002/0153997 A1* | 10/2002 | Nakane | G06K 19/0701 340/10.34 |
| 2006/0156027 A1* | 7/2006 | Blake | G06K 19/10 713/186 |
| 2007/0223685 A1 | 9/2007 | Boubion et al. | |
| 2008/0173709 A1* | 7/2008 | Ghosh | G07C 9/27 235/382 |
| 2010/0013606 A1* | 1/2010 | Gallo | G06F 12/1441 340/10.51 |
| 2010/0096452 A1* | 4/2010 | Habraken | G06Q 20/327 235/382 |
| 2012/0159148 A1* | 6/2012 | Behren | G06Q 20/3278 713/150 |
| 2014/0266591 A1* | 9/2014 | Klammer | H04L 9/3247 340/5.65 |
| 2014/0337621 A1 | 11/2014 | Nakhimov | |
| 2016/0380997 A1* | 12/2016 | Blasi | H04L 63/0807 726/9 |
| 2017/0353312 A1* | 12/2017 | Cuypers | H04L 9/3271 |

OTHER PUBLICATIONS

"Contactless smart card." Wikipedia. Obtained from [https://en.wikipedia.org/wiki/Contactless_smart_card] on May 22, 2020.

"Proximity card." Wikipedia. Obtained from [https://en.wikipedia.org/wiki/Proximity_card] on May 22, 2020.

"Near-field communication." Wikipedia. Obtained from [https://en.wikipedia.org/wiki/Near-field_communication] on May 22, 2020.

"Radio-frequency identification." Wikipedia. Obtained from [https://en.wikipedia.org/wiki/Radio-frequency_identification] on May 22, 2020.

"ISO/IEC 14443." Wikipedia. Obtained from [https://en.wikipedia.org/wiki/ISO/IEC_14443] on May 22, 2020.

"ISO/IEC 7816." Wikipedia. Obtained from [https://en.wikipedia.org/wiki/ISO/IEC_7816] on May 22, 2020.

"ISO/IEC 15693." Wikipedia. Obtained from [https://en.wikipedia.org/wiki/ISO/IEC_15693] on May 22, 2020.

"ISO/IEC 18000." Wikipedia. Obtained from [https://en.wikipedia.org/wiki/ISO/IEC_18000] on May 22, 2020.

"AN1909—How to Create an Installation Identifier (IID)." Rev. 1.0. Nov. 14, 2016. NXP Semiconductors.

"AN12057—Making Reader Infrastructures Ready for Multi-Application Cards and Devices." Rev. 1.0. Oct. 3, 2017. NXP Semiconductors.

"AN12113—Over-the-Air Top-Up with MIFARE DESFire EV2 and MIFARE Plus EV1." Rev. 1.1. Oct. 28, 2019. NXP Semiconductors.

"AN12304—Leakage Resilient Primitive (LRP) Specification." Rev. 1.1. Mar. 13, 2019. NXP Semiconductors.

"AN12341—MIFARE DESFire Light Quick Start Guide." Rev. 1.0. Jan. 31, 2019. NXP Semiconductors.

"AN12342—Card Coil Design Guide for MIFARE DESFire Light." Rev. 1.0. Jan. 31, 2019. NXP Semiconductors.

"AN12343—MIFARE DESFire Light Features and Hints." Rev. 1.1. Jan. 20, 2020. NXP Semiconductors.

"AN12344—MIFARE DESFire Light Target Applications and Usage." Rev. 1.0. Jan. 31, 2019. NXP Semiconductors.

"AN12694—MIFARE SAM AV3—For MIFARE Ultralight C and MIFARE Ultralight EV1." Rev. 1.2. Jan. 8, 2020. NXP Semiconductors.

"AN12695—MIFARE SAM AV3—Quick Start Up Guide." Rev. 1.3. May 12, 2020. NXP Semiconductors.

"AN12696—MIFARE SAM AV3—For MIFARE DESFire." Rev. 1.2. May 12, 2020. NXP Semiconductors.

"AN12697—MIFARE SAM AV3 for NTAG 424 DNA." Rev. 1.1. Jan. 8, 2020. NXP Semiconductors.

"AN12698—MIFARE SAM AV3 for NTAG 5, ICODE DNA and UCODE DNA." Rev. 1.2. Mar. 12, 2020. NXP Semiconductors.

"AN12701—MIFARE SAM AV3—Interface and Architecture." Rev. 1.1. Jan. 9, 2020. NXP Semiconductors.

"AN12704—MIFARE SAM AV3—Host Communication." Rev. 1.1. Jan. 10, 2020. NXP Semiconductors.

"AN12705—MIFARE SAM AV3—X Interface." Rev. 1.1. Jan. 10, 2020. NXP Semiconductors.

"AN12706—MIFARE SAM AV3—for MIFARE Plus." Rev. 1.2. May 12, 2020. NXP Semiconductors.

"MF0ICU2—MIFARE Ultralight C—Contactless ticket IC." Rev. 3.3. Jul. 30, 2019. NXP Semiconductors.

"MF0ULX1—MIFARE Ultralight EV1—Contactless Ticket IC." Rev. 3.3. Apr. 9, 2019. NXP Semiconductors.

"MF0UN(H)00—MIFARE Ultralight Nano." Rev. 3.1. Sep. 7, 2016. NXP Semiconductors.

"MF1P(H)x1y1—MIFARE Plus EV1." Rev. 3.2. Dec. 6, 2018. NXP Semiconductors.

"MF1S70YYX_V1—MIFARE Classic EV1 4K—Mainstream Contactless Smart Card IC for Fast and Easy Solution Development." Rev. 3.2. Nov. 23, 2017. NXP Semiconductors.

"MF1SEP(H)10x1—MIFARE PLUS SE—Secure Contactless Smart Card IC for Seamless Migration." Rev. 3.1. Mar. 16, 2017. NXP Semiconductors.

"MF2DL(H)x0—MIFARE DESFire Light Contactless Application IC." Rev. 3.3. Apr. 5, 2019. NXP Semiconductors.

"MF3D(H)x2—MIFARE DESFire EV2 Contactless Multi-Application IC." Rev. 3.2. Jun. 12, 2019. NXP Semiconductors.

"MF3ICDx21_41_81—MIFARE DESFire EV1 Contactless Mutli-Application IC." Rev. 3.2. Dec. 9, 2015. NXP Semiconductors.

"MF4SAM3—MIFARE SAM AV3 Secure Access Module." Rev. 3.0. Aug. 2, 2019. NXP Semiconductors.

"UM11316—MIFARE SAM AV3 Evaluation Board." Rev. 1.1. Mar. 12, 2020. NXP Semiconductors.

"AN10787—MIFARE Application Directory (MAD)." Rev. 7.4. Nov. 5, 2018. NXP Semiconductors.

"AN10834—MIFARE ISO/IEC 14443 PICC Selection." Rev. 4.1. Mar. 20, 2020. NXP Semiconductors.

"AN10922—Symmetric Key Diversifications." Rev. 2.2. Jul. 2, 2019. NXP Semiconductors.

"AN10927—MIFARE Product and Handling of UIDs." Rev. 4.1. Jul. 5, 2018. NXP Semiconductors.

"AN10969—System Level Security Measures for MIFARE Installations." Rev. 2.1. Apr. 22, 2020. NXP Semiconductors.

"AN11340—MIFARE Ultralight and MIFARE Ultralight EV1 Features and Hints." Rev. 3.1. Jul. 9, 2018. NXP Semiconductors.

"MF1PLUSx0y1—Mainstream Contactless Smart Card IC for Fast and Easy Solution Development." Rev. 3.2. Feb. 21, 2011. NXP Semiconductors.

"MF1PLUSxOy1—Mainstream Contactless Smart Card IC for Fast and Easy Solution Development." Rev. 3.2. Feb. 21, 2011. NXP Semiconductors.

"AN10833—MIFARE Type Identification Procedure." Rev. 3.6. Jul. 11, 2016. NXP Semiconductors.

"AN10957—Generic Access Control Data Model." Rev. 1.1. Mar. 7, 2011. NXP Semiconductors.

"AN11004—MIFARE DESFire as Type 4 Tag." Rev. 2.4. May 22, 2013. NXP Semiconductors.

* cited by examiner

ENHANCED SECURITY FOR CONTACTLESS ACCESS CARD SYSTEM

INCORPORATION BY REFERENCE

The following commonly-owned patents and/or patent application publications are hereby incorporated by reference in their entirety: U.S. Pat. Nos. 9,580,931; 9,077,716; 9,407,624; 9,781,599; and 10,529,156.

TECHNICAL FIELD

Aspects of the present disclosure are generally related to access control systems and are particularly directed to providing enhanced security for contactless access card systems.

BACKGROUND

Contactless "smart" cards ("contactless cards") derive their name from their ability to be read by a card reader without contacting the card reader by bringing the card in relatively close proximity to the card reader. For this reason, contactless cards may sometimes be referred to as proximity cards or vicinity cards. The distance between the card and the card reader may depend on the type of contactless card and communication protocols employed by the card and the card reader. For example, the distance between the contactless card and the card reader may be as far as 6 feet (2 meters), may be up to 15 inches (50 centimeters), or may be as close as 1-3 inches (2-10 centimeters). Some types of contactless cards may be passive and thus powered by the wireless signals received from the card reader. Other types of contactless cards may be active and powered by an internal power source. To protect the data stored on contactless cards, security mechanisms are needed.

SUMMARY

To overcome the challenges described above, techniques for enhancing the security of contactless access card systems are provided. A unique identifier of an access card is used to generate an operation key that is encrypted and stored to the access card as well as multiple keys that are used to protect the operation key. One of the generated keys is employed as a cryptographic key that is used to encrypt and decrypt the operation key. Another one of the generated keys is used to replace a default key that controls access to a memory sector that stores the encrypted operation key at the access card. One of the generated keys may also be an initialization vector used when encrypting and decrypting the operation key.

The keys may be generated using one or more secret key generation algorithms. A provisioning process may read the unique identifier from the access card and use the unique identifier to generate the operation key and the corresponding keys. A card reader may be configured with the same key generation algorithms. When the card reader detects the presence of the access card, the card reader may read the unique identifier from the access card and use it with the key generation algorithms to generate the keys necessary to read the encrypted operation key from the access card and decrypt it. The card reader may also validate the operation key in order to determine whether access should be granted or denied.

This summary is not intended to identify critical or essential features of the disclosures herein, but instead merely summarizes certain features and variations thereof. Other details and features will also be described in the sections that follow.

BRIEF DESCRIPTION OF THE DRAWINGS

Some features herein are illustrated by way of example, and not by way of limitation, in the figures of the accompanying drawings and in which like reference numerals refer to similar elements.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As noted above, security mechanisms are needed to protect the data stored on a contactless card. Some contactless cards may be manufactured and configured with certain security mechanisms to protect the data stored on the contactless card and to protect the communications between the contactless card and the card reader. The present disclosures provide means for providing enhanced security mechanisms in addition to any existing security mechanisms present in a contactless card. For example, the enhanced security mechanisms may provide additional security at the application layer on top of any existing security between the card and the card reader. These enhanced security mechanisms thus mitigate the risk of exposing, to unauthorized entities, the data stored on the contactless card or the content of the communications between the card and the card reader.

The enhanced security mechanisms provided herein are described by way of example in the context of a contactless access control system. The contactless card is thus referred to in this example context as a "contactless access card" or simply an "access card." In this example context, the card reader may be in signal communication with an access control device (e.g., an electronic door lock) and the contactless access card may be employed to obtain access via the access control device (e.g., by unlocking the door when the access card is presented to the card reader). It should be appreciated, however, that the enhanced security mechanisms disclosed herein may be employed in other contexts that involves contact between the card and card reader, e.g., where the card is inserted into the card reader. It should also be appreciated that the enhanced security mechanisms disclosed herein may be employed in contexts other than access control systems. The enhanced security mechanisms described herein may be employed to enhance the security of contactless cards and contact cards in a wide variety of applications. Some examples include personal identification (e.g., ID badges), electronic payments (e.g., credit or debit payments), electronic ticketing (e.g., transit passes), computer security (e.g., cryptographic key storage), tracking (e.g., attendance), record keeping (e.g., electronic health records), and the like.

Figure 1:
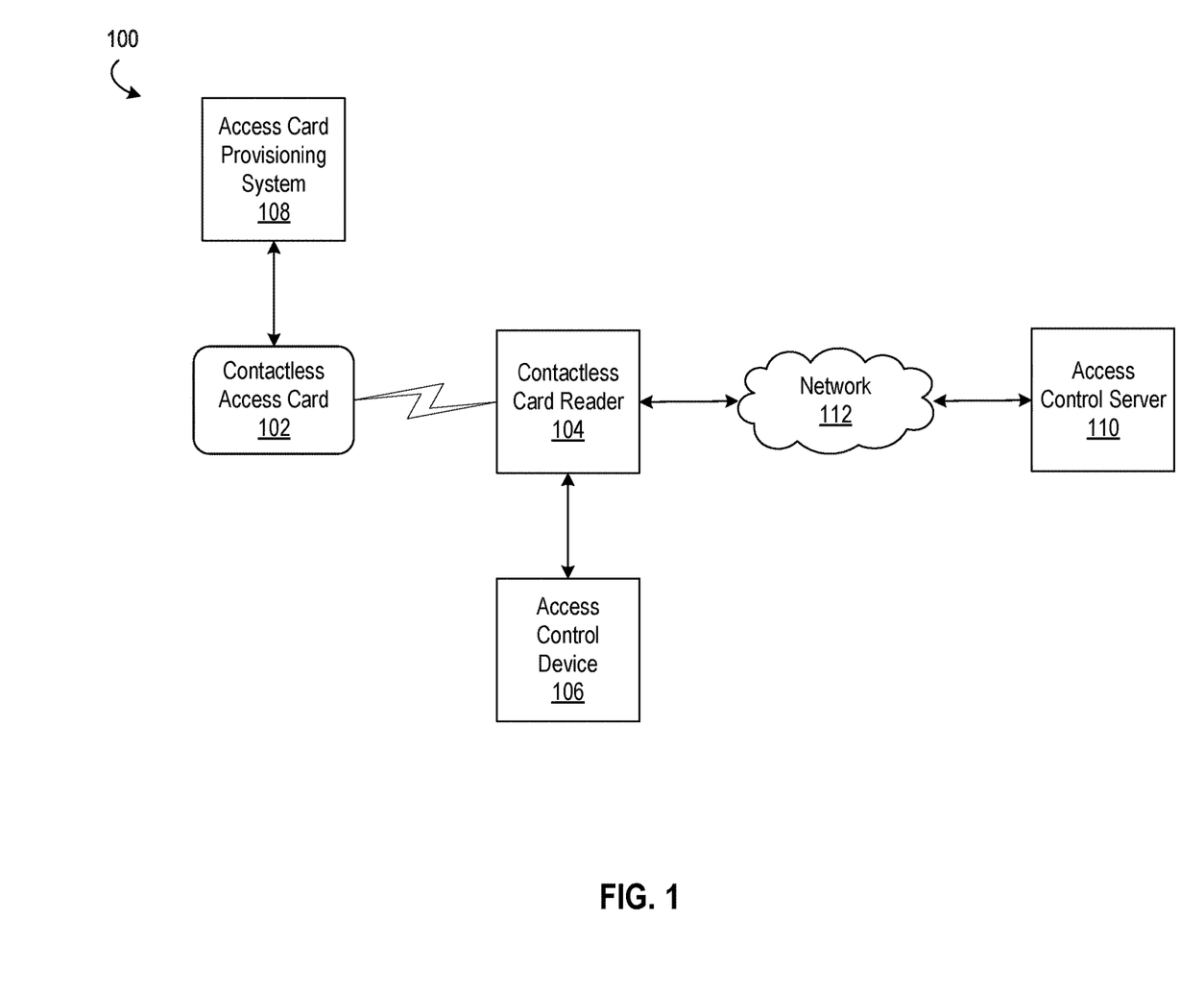
FIG. 1 is a diagram depicting an example access control system employing a contactless access card in accordance with aspects of the present disclosure.

Turning now to FIG. 1, a diagram depicting an example access control system 100 employing a contactless access card in accordance with aspects of the present disclosure is shown. The access control system 100, in this example, includes a contactless access card 102 ("access card"), a contactless card reader 104 ("card reader"), and an access control device 106. As noted above, the access control device 106 may be an electronic door lock. An example of an electronic door lock is described in U.S. Pat. No. 9,580,931 and in commonly-owned U.S. Pat. No. 9,077,715.

As seen in FIG. 1, the access card 102 may be in wireless signal communication with the card reader 104. Any suitable wireless protocol may be employed to facilitate wireless communications between the access card 102 and the card reader 104. Examples of suitable wireless communication protocols may be identified or described in ISO/IEC 14443, ISO/IEC 15693, ISO/IEC 18000, or ISO/IEC 7816. In some example implementations, the access card 102 and the card reader 104 may be configured such that the access card must be within about 2-3 millimeters for the card reader 104 to detect and read the data stored on the access card. Accordingly, the access card 102 and the card reader 104 may be configured to employ near-field communication (NFC) and/ or radio-frequency identification (RFID) protocols to communicate with each other. The card reader 104 may be in wired and/or wireless signal communication with the access control device 106. The access control device 106 may thus be installed into, onto, or otherwise in association with, e.g., a movable barrier such as a door, gate, lid, and the like. The access control device 106 may thus control, e.g., access through a portal (e.g., ingress and/or egress), access to a compartment, and the like.

The access control system 100, in this example, also includes an access card provisioning system 108 and an access control server 110. The card reader 104 may be in signal communication with the access control server 110 via a network 112. The network 112 may include multiple wired and/or wireless networks including, for example, one or more of a local area network (LAN), a wide area network (WAN) such as the Internet, a cellular network, a satellite network, and the like. As described in further detail below, the access control server 110 may be utilized to perform authentication procedures and/or authorization procedures (e.g., by enforcing access control rules). The authentication and/or authorization procedures performed by the access control server 110 may be performed in addition to or in lieu of any authentication and/or authorization procedures performed by the card reader 104. As also described in further detail below, the access card provisioning system 108 may be utilized to provision the access card 102 with the data that enhances the security of the access card when presented to the card reader 104. The same entity may provide and operate both the access control server 110 and the access card provisioning system 108, e.g., the manufacturer of the access card 102 and the card reader 104. Accordingly, the access card provisioning system and the access control server 110 may, in some cases, reside in the same physical and/or logical computer system and/or on the same physical and/or logical computer network, e.g., the same computer system and/or computer network of the manufacturer. In some circumstances, however, different entities may respectively provide and operate the access card provisioning system 108 and the access control server 110. For example, the manufacturer of the access card 102 and the card reader 104 may provide and operate the access card provisioning system 108 while the purchaser of the access card and card reader provides the access control server 110 (e.g., to establish purchaser-specific access control rules). Example access control servers and access control systems are described in commonly-owned U.S. Pat. Nos. 9,077,716; 9,407,624; 9,781,599; and U.S. Pat. No. 10,529,156.

Figure 2:
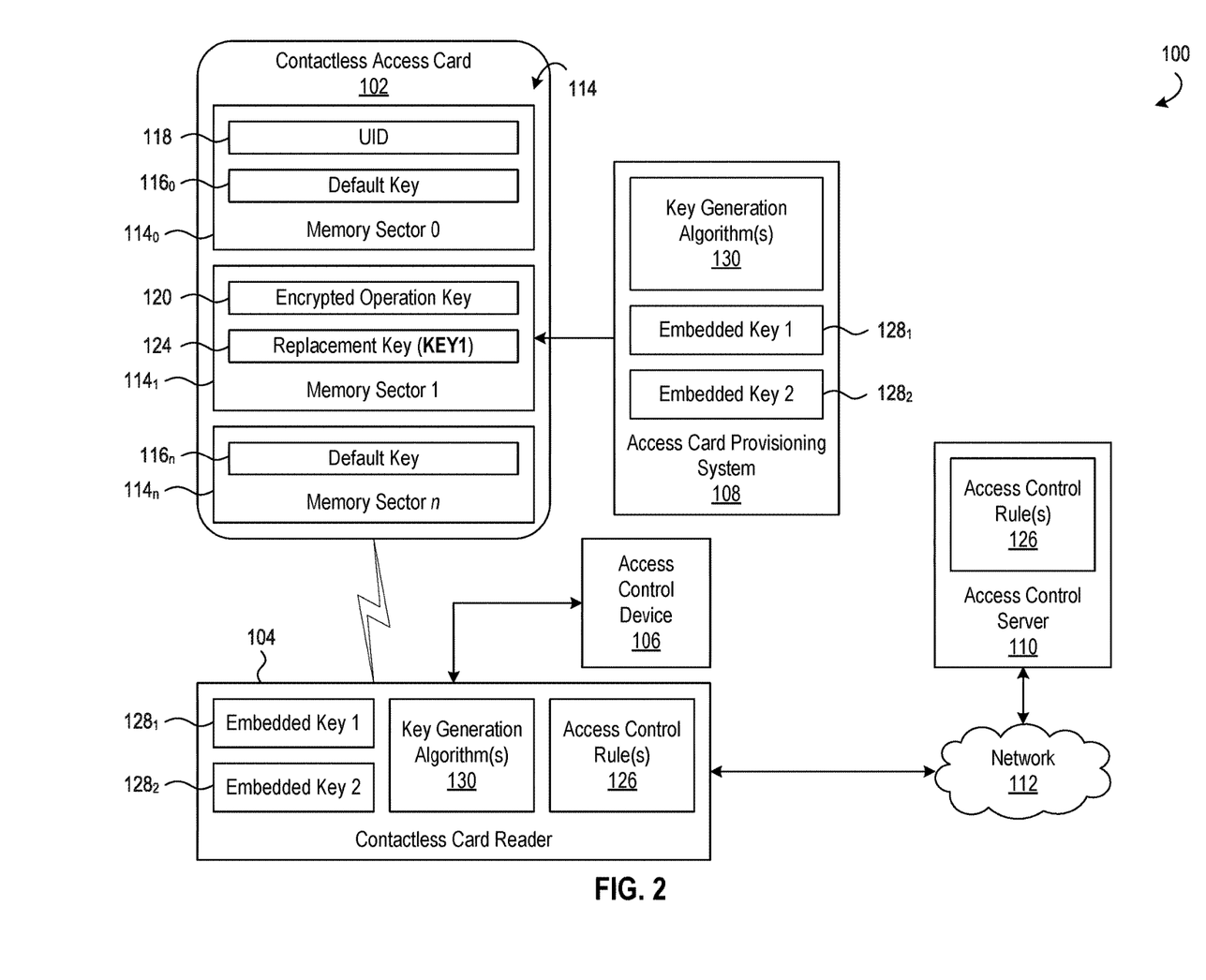
FIG. 2 is a diagram depicting a more detailed view of certain elements of the example access control system of FIG. 1 in accordance with aspects of the present disclosure.

In FIG. 2, a diagram depicting a more detailed view of certain elements of the example access control system 100 of FIG. 1 is shown. The access card 102, in this example, includes multiple memory sectors 114 (collectively). For example, memory sector $114_0$, memory sector $114_1$, and memory sector $114_n$ of the access card 102 are shown. The access card may also include multiple keys 116 (collectively) that control read access to a corresponding memory sector. The access card 102 may be manufactured with default keys that control read access to their corresponding memory sectors. For example, default key $116_0$ may control read access to memory sector $114_0$, and default key $116_n$ may control read access to memory sector $114_n$. In this way, the card reader may be able to read the data stored in these memory sectors $114_0$ and $114_n$ using the default keys $116_0$ and $116_n$, respectively. For example, the card reader 104 may transmit a signal requesting read access to a particular memory sector 114 of the access card 102. The signal from the card reader may include or otherwise indicate the key for the desired memory sector. Upon receipt of the request to access a specified memory sector 114 and the appropriate key for that memory sector, the access card 102 may transmit a response that includes or otherwise indicates the data stored in the specified memory sector. If the card reader 104 does not provide the appropriate key for the desired memory sector, the access card 102 may not respond, may provide a blank response, or may respond with something other than the data stored in the memory sector (e.g., a string of zeros). The access card 102 and card reader 104 may also provide one or more security mechanisms to allow the card reader to read data from the access card. Examples of such security mechanisms may be described in ISO/IEC 9798, e.g., ISO/IEC9798-2, and ISO/IEC 7816 (for contact-based cards). Access cards of the type described above or similar to the type of access card described above include those implementing one or more of the MIFARE protocols and/or implemented using one or more MIFARE products provided by NXP Semiconductors of Eindhoven, Netherlands.

In the example access card 102 shown in FIG. 2, the first memory sector—memory sector $114_0$—stores a unique identifier (UID) 118 of the access card. The UID 118 of the access card 102 may be a universally unique identifier (UUID). The card reader 104 is configured to query the access card 102 for its UID 118. In response to this query, the access card may provide its UID 118 to the card reader 104. The card reader 104 may or may not need to use the default key $116_0$ of the memory sector $114_0$ to obtain the UID 118 from the access card 102.

To provide enhanced security at the access control system 100, the access card 102, in this example, also stores an encrypted operation key 120 in another memory sector, e.g., memory sector $114_1$. As described in further detail below, the card reader employs an operation key 122 (FIG. 3 and FIG. 4) to provide the enhanced security at the application layer, e.g., by validating the operation key before granting access. The operation key 122 may be based on the UID of the access card 102. The operation key 122 may be, for example, a 16-byte operation key. The operation key 122 may also be based on a manufacturing code and one or more fixed characters. Accordingly, a first set of bytes of the operation key 122 may correspond to the UID of the access card, a second set of bytes of the operation key may correspond to a manufacturing code, and a third set of bytes of the operation key may correspond to a set of fixed text characters. The operation key 122 may be formatted such that individual bytes of the first, second, and third sets of bytes are arranged non-sequentially in the operation key. In other words, some bytes corresponding to the UID of the access card 102 may be arranged non-sequentially relative to other bytes corresponding to the UID of the access card. Similar non-sequential arrangements may be employed for the second and third sets of bytes of the operation key 122 respectively corresponding to the manufacturing code and the fixed text characters. The following table illustrates an example format of an example 16-byte operation key in accordance with the non-sequential arrangement described above.

| Byte Position | Description |
| --- | --- |
| Byte 0 | fixed character |
| Byte 1 | fixed character |
| Byte 2 | Byte a of access card UID |
| Byte 3 | Byte b of access card UID |
| Byte 4 | Byte x of manufacturing code |
| Byte 5 | Byte y of manufacturing code |
| Byte 6 | Byte c of access card UID |
| Byte 7 | Byte d of access card UID |
| Byte 8 | fixed character |
| Byte 9 | fixed character |
| Byte 10 | Byte e of access card UID |
| Byte 11 | Byte f of access card UID |
| Byte 12 | fixed character |
| Byte 13 | fixed character |
| Byte 14 | Byte g of access card UID |
| Byte 15 | Byte h of access card UID |

As seen in the example 16-bit operation key above, the bytes of the access card UID are arranged non-sequentially in the operation key, e.g., a set of fixed characters (in Byte 8 and Byte 9) are positioned in between a first pair of bytes of the access card UID (in Byte 6 and Byte 7) and a second pair of bytes of the access card UID (in Byte 10 and Byte 11). Put differently, the bytes of the access card UID are distributed in the operation key in a non-contiguous fashion. The bytes of the operation key corresponding to the fixed characters and the manufacturing code, in this example, are interleaved with the bytes of the operation key that correspond to the bytes of the access card UID. The process of encrypting the operation key 122 and decrypting the encrypted operation key 120 will be described in further detail below with reference to FIG. 3 and FIG. 4.

Still referring to FIG. 2, the card reader 104 may decrypt the encrypted operation key 120 to obtain the decrypted operation key 122, may validate the decrypted operation key. Validating the operation key 120 may include, for example, validating the format of the operation key. Validating the format of the operation key may include, for example, confirming that the operation key contains the expected bytes of the UID of the access card 102, confirming that the operation key contains the expected bytes manufacturing code, confirming that the operation key contains the expected set of fixed characters, and/or confirming that those bytes and fixed characters are arranged in the operation key according to their expected arrangement.

If the card reader 104 successfully validates the operation key 122, the card reader may provide an indication of granted access. The card reader 104 may provide the indication of granted access to the access control device 106 and/or the access control server 110. The access control device and/or access control server 110 may apply one or more access control rules 126 before providing the indication of granted access. If an access control rule 126 indicates access should not be granted, the card reader 104 may not provide the indication of granted access even if the operation key 120 is successfully validated. Where the access control device 106 is an electronic lock, for example, the indication of granted access may be a command to toggle to an unlocked state. Access control rules may specify, for example, date(s) and/or time(s) during which access is permitted and/or prohibited. Access control rules may apply globally to all users, semi-globally to certain types of users, or specifically to individual users. Some examples of access control rules are described in commonly-owned U.S. Pat. No. 9,077,716. Additional and alternative examples of other types of indications of granted access will be appreciated with the benefit of this disclosure.

To provide enhanced security at the access control system 100, the access card 102, in this example, further stores a replacement key (KEY1) 124 in the memory sector $114_1$ that stores the encrypted operation key 120. The replacement key 124 is referred to as such because it replaces the default key that controls read access to the memory sector $114_1$ that stores the encrypted operation key 120. In other words, the replacement key 124 overwrites the default key that originally controls read access to memory sector $114_1$ of the access card 102. The default key may be originally written to the memory sector during manufacture of the access card. In this way, the card reader 104 may not read the encrypted operation key 120 from the access card 102 unless the card reader provides or otherwise indicates the key that controls read access to the memory sector that stores the encrypted operation key, e.g., replacement key 124 for memory sector $114_1$ in this example. The replacement key 124 may be, for example, a 48-bit key Like the operation key 120, and as also described in further detail below, the replacement key 124 may also be generated based on the UID 118 of the access card. The replacement key 124 may also be generated based on one of multiple hardcoded embedded keys 128 (collectively) that are embedded in the firmware of the card reader 104, e.g., embedded key 1281. Embedded key 1281 may thus also be, for example, a 48-bit hardcoded key that is embedded in the firmware of the card reader 104. The embedded keys 128 may be stored at different memory locations in the firmware of the card reader 104. The embedded keys 128 may be unique to the card reader 104. In other words, the embedded keys 128 may be device-specific embedded keys. The embedded keys 128 may be generated and stored in the firmware of the card reader 104 during manufacture of the card reader.

The operation key 122 and the replacement key 124 may be generated during a provisioning process. This provisioning process may involve encrypting the operation key 122 to obtain the encrypted operation key 120, writing the encrypted operation key to a memory sector of the access card (e.g., memory sector 114$_1$), and replacing the default key that controls read access to that memory sector with the replacement key 124 (e.g., overwriting the default key). As noted above, both the operation key 122 and the replacement key 124 may be based on the UID 118 of the access card 102. As also noted the replacement key 124 also may be based on a hardcoded embedded key 128$_1$ that is embedded in the firmware of the card reader 104.

One or more key generation algorithms 130 may be employed to generate the replacement key 124. Both the card reader 104 and the access card provisioning system 108 may be configured with the key generation algorithm(s) 130. The access card provisioning system 108 may employ the key generation algorithm(s) 130 during the provisioning process that provisions the access card 102 with the encrypted operation key 120 and the replacement key 124.

The card reader 104 may and employ the key generation algorithm(s) 130 when authenticating and authorizing the access card 102 to grant or deny access via, e.g., the access control device 106. The key generation algorithm(s) may be proprietary (e.g., secret, private) key generation algorithms known only to the entity that manufactures the access cards and card readers and/or to the entity that provisions the access cards with their respective operation keys and replacement keys. One or more key generation algorithms may be employed. For example, a single key generation algorithm may be configured to generate different types of keys, e.g., a 48-bit key and a 128-bit key. As another example, one key generation algorithm may be configured to generate a first type of key (e.g., a 48-bit key), and another key generation algorithm may be configured to generate a second type of key (e.g., a 128-bit key). The key generation algorithm(s) 130 may take as input the UID 118 of the access card 102 and, in some examples, one or more of the embedded keys 128 of the card reader 104. The key generation algorithm(s) 130 may provide as output one or more keys.

In addition to the replacement key 124 (KEY1), the key generation algorithm(s) may also generate two additional keys used to encrypt the operation key 122 and decrypt the encrypted operation key 120. For example, with brief reference to FIG. 3 and FIG. 4, the key generation algorithm(s) may generate a cryptographic key 132 (KEY2) an initialization vector 134 (KEY3) that are used with the encryption and decryption process. The cryptographic key 132 may be, for example, a symmetric key used to both encrypt the operation key 122 and decrypt the encrypted operation key 120. Alternatively, the cryptographic key 132 may be a pair of asymmetric keys in which one key is used to encrypt the operation key 122 while another key is used to decrypt the encrypted operation key 120. Accordingly, when used for encryption, the cryptographic key may be referred to as an encryption key, and when used for decryption the cryptographic key may be referred to as a decryption key. The cryptographic key 132 may be a 128-bit key. The cryptographic key 132 may be based on the UID 118 of the access card 102. In some examples, the cryptographic key 132 may also be based on one of the embedded keys 128 of the card reader (e.g., embedded key 128$_2$). The initialization vector 134 may be a 128-bit key. The initialization vector 134 may be based on the UID 118 of the access card 102.

Figure 3:
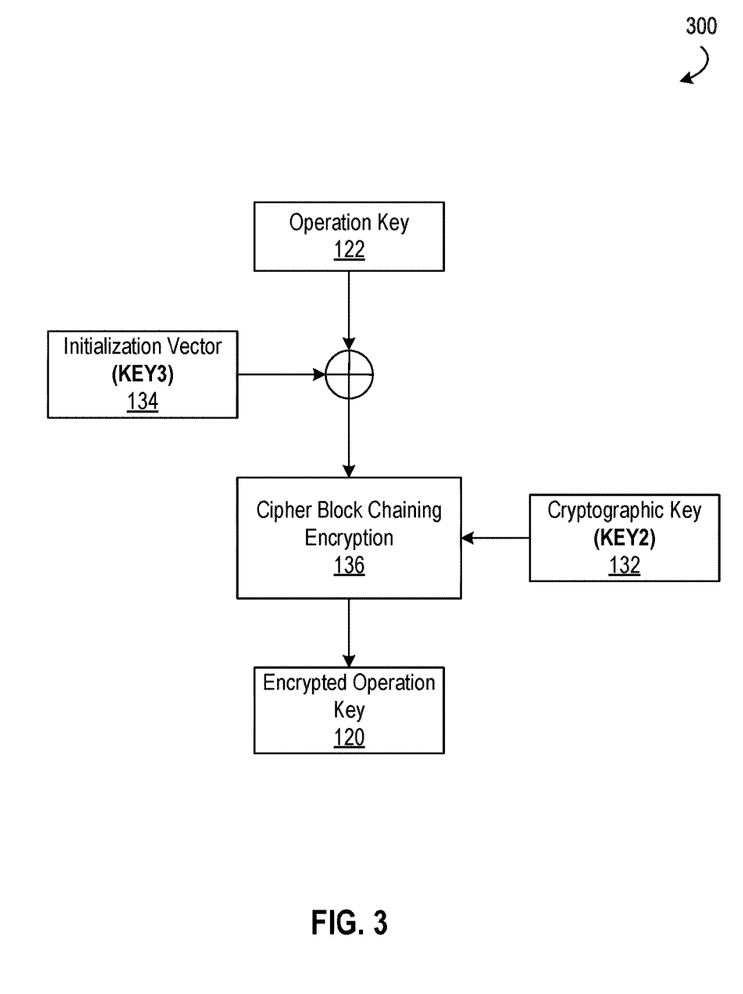
FIG. 3 is a diagram depicting an example encryption procedure in accordance with aspects of the present disclosure.
Figure 4:
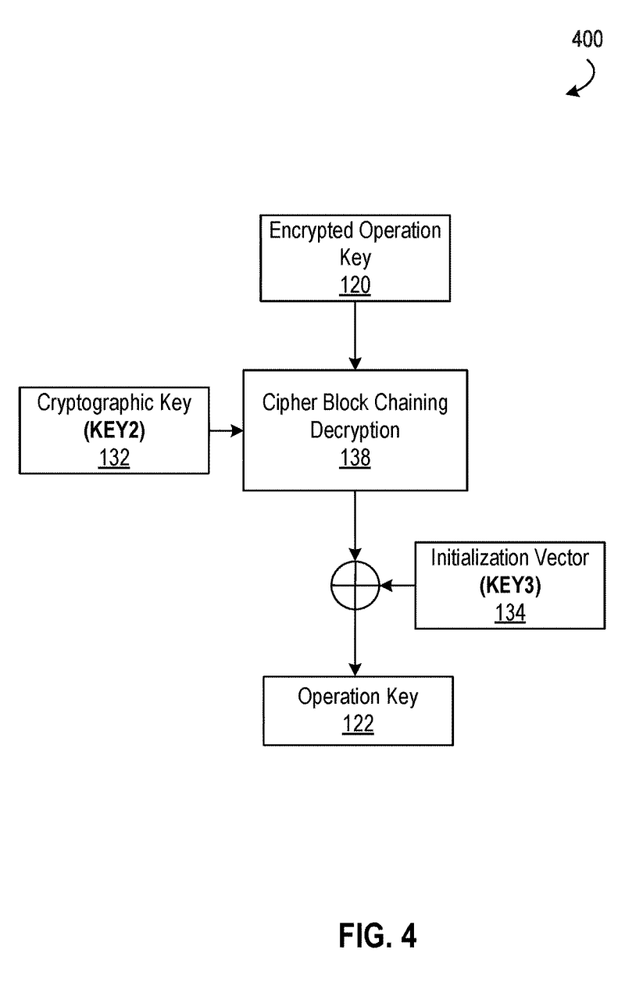
FIG. 4 is a diagram depicting an example decryption procedure in accordance with aspects of the present disclosure.

Turning to FIG. 3 and FIG. 4, diagrams depicting an example encryption procedure 300 (FIG. 3) and an example decryption procedure 400 (FIG. 4) are respectively shown.

The encryption process 136 may employ the Advanced Encryption Standard (AES) specification with cipher block chaining (CBC). This AES-CBC encryption process 136 may employ both the initialization vector 134 and the cryptographic key 132 to encrypt the operation key 122 and provide the encrypted operation key 120. Similarly, the decryption process 138 may employ the AES specification with cipher block chaining. The AES-CBC decryption process 138 thus also may employ the initialization vector 134 and cryptographic key 132 to decrypt the encrypted operation key 120 and provide the decrypted operation key 122. The access card provisioning system 108 (FIG. 1 and FIG. 2) may be configured to perform the encryption process 136, e.g., when provisioning the access card 102 with the encrypted operation key 120. The card reader 104 may be configured to perform the decryption process 138, e.g., based on detecting the presence of the access card 102 and determining whether to grant access. It should be appreciated that AES-CBC encryption/decryption is only one example of an encryption/decryption scheme that may be employed to encrypt the operation key. Other suitable cryptographic schemes may be employed to encrypt and decrypt the operation key. For example, where CBC is not used, the access control system may omit the use of an initialization vector (e.g., initialization vector 134). In another example, multiple initialization vectors may be generated for the encryption/decryption procedures.

Because the card reader 104 is configured with the one or more key generation algorithm(s), the card reader need not persistently store the cryptographic key 132 or the initialization vector 134. Rather, the card reader 104 may instead dynamically generate the cryptographic key 132 and the initialization vector 134 in an ad hoc fashion based on detecting the presence of an access card (e.g., access card 102) and obtaining a UID (e.g., UID 118) of the access card. In addition, because the replacement key 124, cryptographic key 132, and initialization vector 134 are each based on the UID 118 of the access card 102, each access card may be associated with a unique replacement key, cryptographic key, and initialization vector. Furthermore, because the card reader 104 includes the key generation algorithm(s), it is advantageously equipped to authenticate and authorize multiple access cards without the need to store multiple keys respectively associated with those access cards.

The enhanced security features described herein thus mitigate the risk of unauthorized access by cloning an access card because, without the replacement key, the memory sector storing the encrypted operation key cannot be read. To mitigate the risk that the replacement key is exposed during the authentication process (e.g., by "sniffing" the communications exchanged between the access card and card reader), the sensitivity of the card reader may be reduced so as to require close proximity between the access card and card reader in order for the card reader to detect the presence of the access card. For example, the sensitivity of the card reader may be configured such that the access card must be within 2-3 millimeters in order for the card reader to detect its presence. The risk of unauthorized access is also mitigated by, for example, the secret nature of the key generation algorithm(s) used to generate the replacement keys, the cryptographic keys, and the initialization vectors. The risk of unauthorized access is further mitigated by the secret nature of the AES-CBC encryption/decryption processes used to encrypt and decrypt the operation keys. In addition, the risk of unauthorized access is mitigated by the particular format of the operation key, including the particular arrangement of the bytes of the operation key, which must be validated before access is granted.

Figure 5:
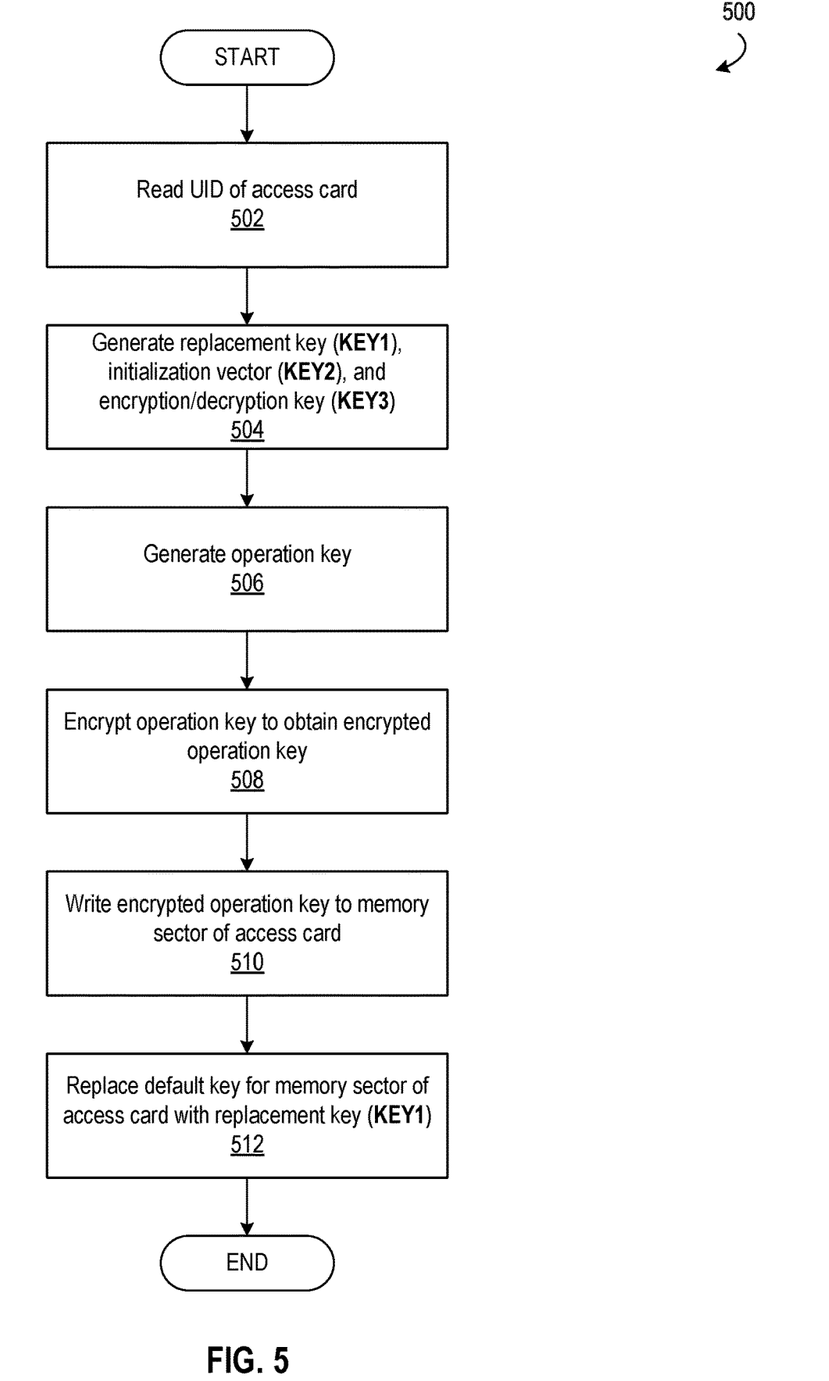
FIG. 5 is a diagram depicting a flowchart of example method steps for provisioning a contactless access card in accordance with aspects of the present disclosure.

Referring now to FIG. 5, a flowchart 500 of example method steps for provisioning a contactless access card (e.g., access card 102) is shown. As noted above, an access card provisioning system (e.g., access card provisioning system 108) may perform or be used to perform the provisioning process. It should also be appreciated that the steps described herein may be employ or adapted for similarly provisioning a contact-based access card.

To begin, the UID of the access card may be read (502). For example, a card reader (e.g., similar to card reader 104) or some other card-reading equipment may be used to read the UID from the access card. Having read the UID, a replacement key (e.g., replacement key 124), a cryptographic key (e.g., cryptographic key 132), and an initialization vector (e.g., initialization vector 134) may be generated (504) using one or more key generation algorithms as described above. Generating the replacement key and the cryptographic key may include obtaining one or more hard-coded embedded keys (e.g., embedded keys 128) that are embedded in the firmware of the card reader. The embedded keys may be obtained, for example, by reading the embedded keys from the firmware of the card reader itself. As described above, the key generation algorithm(s) may use the UID of the access card and the embedded keys of the card reader to respectively generate the replacement key and the cryptographic key. The operation key may also be generated based on the UID of the access card (506).

Having generated the operation key, the cryptographic key and the initialization vector may be used to encrypt the operation key (508), e.g., using an AES-CBC encryption process. The encrypted operation key may then be written to a memory sector of the access card (510). The default key for that memory sector may then be replaced (e.g., overwritten) with the replacement key generated using the UID of the access card (512). Having written the encrypted operation key and replacement key to the access card, the access card is thus provisioned with additional security features that provide enhanced security at the application layer of an access control system.

Figure 6:
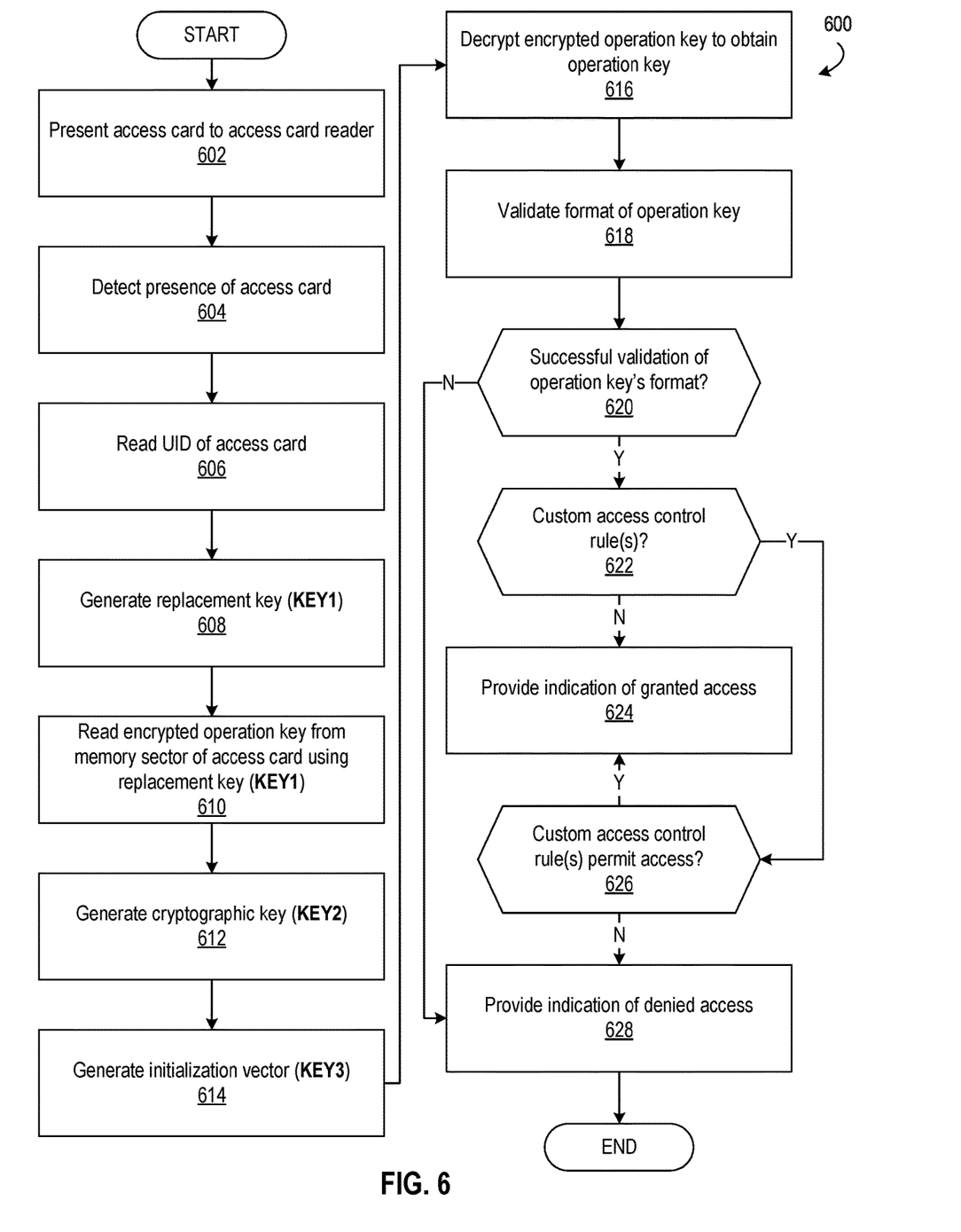
FIG. 6 is a diagram depicting a flowchart of example method steps for reading a contactless access card in accordance with aspects of the present disclosure.

Referring now to FIG. 6, a flowchart 600 of example method steps for reading a contactless access card (e.g., access card 102) is shown. As noted above a card reader (e.g., card reader 104) may perform, at least in part, the process of reading the access card. As also noted above, the card reader may determine whether to grant access, e.g., via an access control device. The card reader may make this determination by itself or in conjunction with another component of an access control system such as an access control server (e.g., access control server 110).

The determination of whether to grant access may include both an authentication procedure and, optionally, an authorization procedure. The authentication procedure may involve authenticating the access card by successfully reading the encrypted operation key from the access card, successfully decrypting the encrypted operation key, and validating the decrypted operation key. Even if the operation key is validated, however, an authorization procedure may be performed to determine whether one or more access control rules restrict or permit access based on desired criteria. For example, access control rules may restrict or permit access based on date, date range, time, timeframe, user type, and the like. The example steps shown in the flowchart 600 of FIG. 6 include steps corresponding to both the authentication procedure and the optional authorization procedure.

To begin, an access card is presented to the card reader (602). When the access card is a sufficient distance away from the card reader, the card reader may detect the presence of the access card (604). As noted above, the distance between the access card and the card reader may depend on the sensitivity of the access card reader. Having detected the presence of the access card, the card reader may read the UID from the access card (606). With the UID the card reader may then generate the replacement key that controls access to the memory sector that stores the encrypted operation key in the access card (608). As described above, the card reader may include the same key generation algorithm(s) used to provision the access card with the replacement key.

Using the replacement key, the card reader may read the encrypted operation key from the appropriate sector of the access card (610). The card reader may also generate the cryptographic key (612) and generate the initialization vector (614) used to decrypt the encrypted operation key. It will be appreciated that the card reader need not wait until the encrypted operation key is read to generate the cryptographic key and/or initialization vector. For example, the card reader may generate the cryptographic key and/or initialization vector based on reading the UID of the access card. The card reader may use the generated cryptographic key and, if necessary, initialization vector, to decrypt the encrypted operation key obtain the original operation key generated for the access card (616). The card reader may then validate the format of the operation key (618). As described above, validating the format of the operation key may include determining whether a sequence of bytes in the operation key match an expected sequence of bytes. As also described above, the sequence of bytes of the operation key may depend on the UID of the access card.

If the card reader successfully validates the operation key (620:Y) and there are no custom access control rules to apply and enforce (622:N), then the card reader may provide an indication of granted access (624). It should be appreciated that, even if there are no custom access control rules to apply and enforce, one or more default access control rules may be applied and enforced. An example of a default access control rule may permit access twenty-four hours a day, seven days a week ("24/7 access"). Providing a default access control rule (e.g., "24/7 access") may be advantageous such that the system architecture is configured to apply and enforce one or more access control rule(s) whereby default access control rules can be conveniently replaced with customized access control rules without modifying the underlying system architecture. It should also be appreciated, however, that the system architecture may be configured such that it does not apply any access control rules and provides an indication of granted access based on successfully validating the operation key. As described above, the indication of granted access may be provided to an access control device (e.g., an electronic door lock). Upon receipt of the indication of granted access, an access control device may permit access (e.g., an electronic lock my toggle to an unlocked state). The indication of granted access may also include an audible indication (e.g., sounding a bell), a visual indication (e.g., activating a green light, displaying a message on an electronic display), and/or a message to another component of the access control system, e.g., to an access control server for logging, notification, and other types of responses. The card reader may also provide the indication of granted access (624) if there exist applicable access control rules (622:Y), and those access control rules indicate access is permitted (626:Y).

If the card reader does not successfully validate the operation key (620:N), or if any applicable access control rules indicate access is not permitted (626:N), then the card reader may provide an indication of denied access (628). The indication of denied access may likewise include one or more of an audible indication (e.g., sounding a buzzer), a visual indication (e.g., activating a red light, displaying a message on an electronic display), and/or a message to another component of the access control system, e.g., to an access control server for logging, notification, and other types of responses.

As described above the card reader itself and/or the access control server may store access control rules that may be applied and enforced during this authorization procedure. Accordingly, the card reader may be configured to query the access control server for any applicable access rules and/or query the access control server for an indicated of granted or restricted access. In other words, the access control server may provide the card reader with one or more access rules to apply, and the card reader may apply and enforce the access control rules received from the access control server. Additionally or alternatively, the card reader may persistently store access control rules that it applies and enforces without querying the access control server.

In some examples, the access control server rather than the card reader may make the determination of whether to grant or deny access. In other words, this determination may be delegated to the access control server and the card reader may simply function to read the encrypted operation key from the access card. Accordingly, the authentication and authorization procedures may be delegated entirely to the card reader, shared between the card reader and the access control server, or delegated entirely to the access control server. As one example, the card reader may be configured to both perform the authentication procedure by reading the access card an validating the operation key and perform the authorization procedure by applying and enforcing any application access control rules without the involvement of an access control server.

As another example, the access card reader may be configured to read the access card and validate the operation key and send a message to the access control server that the operation key has been validated which, in response, applies any applicable access control rules and sends a message back to the card reader indicating whether access should be granted or denied. The opposite configuration is also possible—the card reader may read the access card and send the encrypted operation key to the access control server which, in response, decrypts the encrypted operation key and validates it. The access control server may then send a message back to the card reader indicating that the operation key was successfully validated. In response, the card reader may apply any applicable access control rules to determine whether to grant or deny access.

As a further example, the access control server may be configured to perform both the authentication and authorization procedures. In this example, the card reader may simply read the encrypted operation key and send it to the access control server for decryption and validation. Having successfully validated the operation key and applied any applicable access control rules, the access control server may send a message back to the card reader indicating whether to grant or deny access.

The techniques described herein need not be limited to protecting an encrypted operation key stored on the access card. The techniques described herein may additionally and alternatively be employed to protect any data that might be stored in one or more of the memory sectors of the access card. Such data may be stored in encrypted or plaintext form at the access card. Furthermore, multiple replacement keys may be generated and used to replace multiple default keys respectively stored at the access card and used to control read access of a corresponding memory sector of the various memory sectors of the access card. Accordingly, the one or more key generation algorithms described herein may be configured to generate multiple replacement keys. In addition, multiple operation keys may be generated and stored at the access card. For example, one operation key may be generated for one card reader while another operation key may be generated for another card reader. In this way, a single access card may be configured for use with multiple card readers. As another example, one operation key may be generated to provide a one level or type of access while another operation key may be generated to provide another level or type of access.

Figure 7:
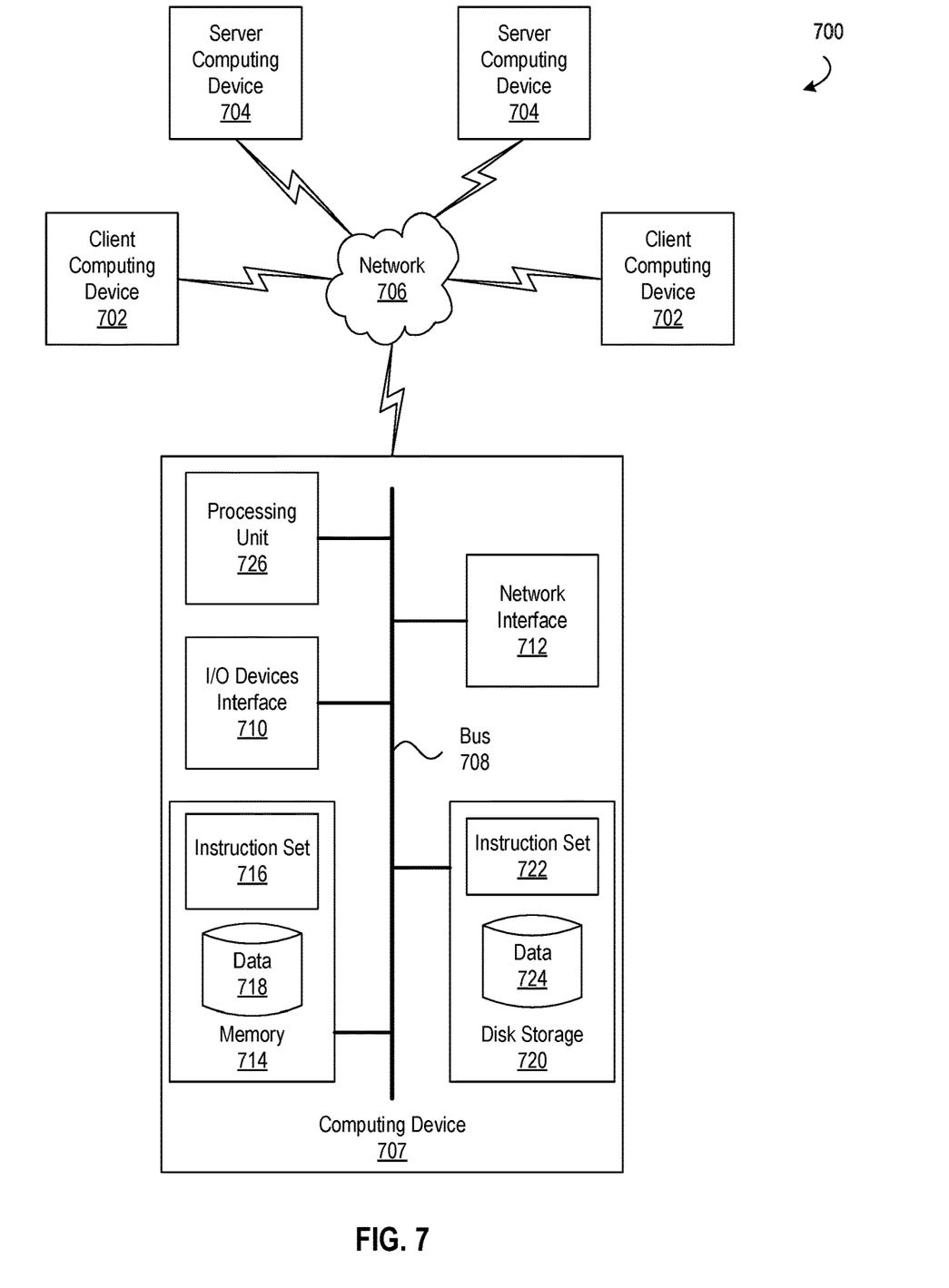
FIG. 7 is a diagram of an example computing environment in which aspects of the present disclosure may be implemented.

Referring now to FIG. 7, an example of an implementation of a computing environment 700 in which aspects of the present disclosure may be implemented is shown. The computing environment may include both client computing devices 702 and server computing devices 704. The client computing devices 702 and server computing devices 704 may provide processing, storage, input/output devices, application programs, and the like. Client computing devices 702 may include, e.g., desktop computers, laptop computers, tablet computers, palmtop computers, smartphones, smart televisions, and the like. Client computing devices 702 may also be in signal communication to other computing devices, including other client computing devices 702 and server computing devices 704 via a network 706. The network 706 may be part of a remote access network, a wide area network (e.g., the Internet), a cellular network, a worldwide collection of computers, local area networks, and gateways that currently use respective protocols (e.g., FTP, HTTP, TCP/IP, etc.) to communicate with one another. Other electronic device architectures and computer network architectures may be selectively employed.

FIG. 7 also depicts a block diagram of one of a computing device 707 of the computing environment 700. The computing device 707 contains a bus 708 the computing device utilizes to transfer information among its components. The bus 708 connects different components of the computing device 707 (e.g., processor, disk storage, memory, input/output ports, network ports, etc.) and enables the transfer of information between those components. An I/O device interface 710 is connected to the bus 708. The I/O device interface 710 connects various input and output devices (e.g., keyboard, mouse, microphone, camera, displays, printers, speakers, etc.) to the computing device 707. A network interface 712 is also attached to the bus 708 and enables the computing device 707 to connect to various other devices attached to a network (e.g., network 706). The memory 714 provides volatile storage for one or more instruction sets 716 and data 718 used to implement aspects described herein. Disk storage 720 provides non-volatile storage for one or more instruction sets 722 (e.g., an operating system) and data 724 used to implement various aspects described herein. The processing unit 726 is also attached to the bus 708 and executes the instructions stored in the memory 714 and/or the disk storage 720. The instruction sets 716 and 722 as well as the data 718 and 724 include a computer program product, including a computer-readable medium (e.g., a removable storage medium such as one or more DVD-ROM's, CD-ROM's, diskettes, tapes, etc.) that provides at least a portion of the software instructions for implementing aspects of the present disclosure. At least a portion of the instructions may also be downloaded via the network 706. As noted above, computer-readable media include all non-transitory computer-readable media and do not include transitory propagating signals.

One or more aspects of the disclosure may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as, e.g., HTML, XML, JavaScript, and the like. The executable instructions may be stored on a computer readable medium such as a hard disk, optical disk, removable storage media, solid state memory, RAM, ROM, etc. In some examples, the instructions may be stored on a tangible computer-readable storage medium, which, is expressly defined herein to include storage devices or storage discs and to exclude transmission media and propagating signals. The functionality of the program modules may be combined or distributed as desired in various embodiments. In addition, the functionality may be embodied in whole or in part in firmware or hardware equivalents such as integrated circuits, field programmable gate arrays (FPGAs), and the like. Various data structures may be used to more effectively implement one or more aspects of the disclosure, and such data structures are contemplated to be within the scope of the executable instructions and computer-usable data described herein.

Aspects of the disclosure have been described in terms of illustrative embodiments thereof. While illustrative systems, devices, and methods as described herein embodying various aspects of the present disclosure are shown, it will be understood that the disclosure is not limited to these embodiments. Modifications may be made particularly in light of the foregoing teachings. For example, the steps illustrated in the illustrative figures may be performed in other than the recited order, and one or more steps illustrated may be optional in accordance with aspects of the disclosure. It will also be appreciated and understood that modifications may be made without departing from the true spirit and scope of the present disclosure. The description is thus to be regarded as illustrative instead of restrictive on the present disclosure.

What is claimed is:

1. An access control system comprising:
an access card comprising a plurality of memory sectors and a plurality of keys, wherein read access to each memory sector of the plurality of memory sectors is controlled by a corresponding key of the plurality of keys,
wherein the plurality of memory sectors comprise:
a first memory sector storing a unique identifier (UID) of the access card; and
a second memory sector storing an encrypted operation key that is based on the UID of the access card; and
wherein the plurality of keys comprises:
a first key that controls read access to the first memory sector; and
a second key that controls read access to the second memory sector and that is based on the UID of the access card; and
an access card reader comprising at least one key generation algorithm and configured to, based on detecting the access card:
read, from the access card, the UID of the access card;
generate, using the at least one key generation algorithm and based on the UID of the access card, the second key of the plurality of keys;
read, using the second key and from the access card, the encrypted operation key;
generate, using the at least one key generation algorithm and based on the UID of the access card, a decryption key;
decrypt, using the decryption key, the encrypted operation key to obtain a decrypted operation key;
validate the decrypted operation key; and
based on successful validation of the decrypted operation key, provide, to an access control device, an indication of granted access.

2. The access control system of claim 1, wherein the operation key is further based on at least one of a plurality of predetermined characters or a manufacturing code.

3. The access control system of claim 2, wherein:
a first plurality of bytes of the operation key are based on a first portion of the UID of the access card;
a second plurality of bytes of the operation key are based on a second portion of the UID of the access card; and
the first plurality of bytes are arranged, in the operation key, non-sequentially relative to the second plurality of bytes.

4. The access control system of claim 3, wherein:
a third plurality of bytes of the operation key are based on the predetermined characters or at least a portion of the manufacturing code; and
the third plurality of bytes is arranged, in the operation key, in between the first plurality of bytes of the operation key and the second plurality of bytes of the operation key.

5. The access control system of claim 1, wherein the access card reader is configured to validate the decrypted operation key at least by validating a format of the decrypted operation key.

6. The access control system of claim 1, wherein:
the access card reader is configured to generate the decryption key further using an embedded key that is embedded in firmware of the access card reader.

7. The access control system of claim 1, wherein the access card reader is further configured to decrypt the encrypted operation key using cipher block chaining decryption.

8. The access control system of claim 7, wherein:
the access card reader is further configured to generate, using the at least one key generation algorithm and based on the UID of the access card, an initialization vector; and
the access card reader is further configured to decrypt the encrypted operation key further using the initialization vector.

9. The access control system of claim 1, wherein the second key is further based on an embedded key that is embedded in firmware of the access card reader.

10. The access control system of claim 1, wherein the access card is configured to:
receive the second key; and replace, with the second key, a default key that controls read access to the second memory sector.

11. The access control system of claim 1, wherein the access card reader is a contactless access card reader.

12. A method of access control comprising:
detecting, by an access card reader comprising at least one key generation algorithm, an access card, wherein the access card comprises:
  a plurality of memory sectors and a plurality of keys, wherein read access to each memory sector of the plurality of memory sectors is controlled by a corresponding key of the plurality of keys,
  wherein the plurality of memory sectors comprise:
    a first memory sector storing a unique identifier (UID) of the access card; and
    a second memory sector storing an encrypted operation key that is based on the UID of the access card; and
  wherein the plurality of keys comprises:
    a first key that controls read access to the first memory sector; and
    a second key that controls read access to the second memory sector and that is based on the UID of the access card;
based on the detecting the access card:
  reading, from the access card, the UID of the access card;
  generating, using the at least one key generation algorithm and based on the UID of the access card, the second key of the plurality of keys;
  reading, from the access card and using the second key, the encrypted operation key;
  generating, using the at least one key generation algorithm and based on the UID of the access card, a decryption key;
  decrypting, using the decryption key, the encrypted operation key to obtain a decrypted operation key;
  validating the decrypted operation key; and
  based on successful validation of the decrypted operation key, provide, to an access control device, an indication of granted access.

13. The method of access control of claim 12, wherein the operation key is further based on at least one of a plurality of predetermined characters or a manufacturing code.

14. The method of access control of claim 13, wherein:
a first plurality of bytes of the operation key are based on a first portion of the UID of the access card;
a second plurality of bytes of the operation key are based on a second portion of the UID of the access card; and
the first plurality of bytes are arranged, in the operation key, non-sequentially relative to the second plurality of bytes.

15. The method of access control of claim 14, wherein:
a third plurality of bytes of the operation key are based on the predetermined characters or a portion of the manufacturing code; and
the third plurality of bytes is arranged, in the operation key, in between the first plurality of bytes of the operation key and the second plurality of bytes of the operation key.

16. The method of access control of claim 12, wherein the validating the decrypted operation key comprises validating a format of the decrypted operation key.

17. The method of access control of claim 12, wherein generating the decryption key comprises generating the decryption key further based on an embedded key that is embedded in firmware of the access card reader.

18. The method of access control of claim 12, wherein the decrypting the encrypted operation key comprises using cipher block chaining decryption.

19. The method of access control of claim 18, further comprising:
generating, using the at least one key generation algorithm and based on the UID of the access card, an initialization vector; and
wherein the decrypting the encrypted operation key further comprises using the initialization vector with the cipher block chaining decryption.

20. The access control method of claim 12, wherein the generating the second key comprises generating the second key further based on an embedded key that is embedded in firmware of the access card reader.

21. The access control method of claim 12, wherein the access card reader is a contactless access card reader.

22. A method of provisioning an access card of an access control system comprising:
reading, by an access card provisioning system, a unique identifier (UID) of an access card, wherein the access card comprises:
  a plurality of memory sectors and a plurality of keys, wherein read access to each memory sector of the plurality of memory sectors is controlled by a corresponding key of the plurality of keys,
  wherein the plurality of memory sectors comprise:
    a first memory sector storing the UID of the access card; and
    a second memory sector,
  wherein the plurality of keys comprises:
    a first key that controls read access to the first memory sector; and
    a second key that controls read access to the second memory sector;
based on the reading the UID of the access card:
  generating, using at least one key generation algorithm and based on the UID of the access card, a replacement key and an encryption key;
  generating, based on the UID of the access card, an operation key;
  encrypting, using the encryption key, the operation key to obtain an encrypted operation key;
  storing, in the second memory sector of the access card, the encrypted operation key; and
  replacing, at the access card, the second key with the replacement key.

23. The method of provisioning an access card of an access control system of claim 22, wherein encrypting the operation key comprises encrypting the operation key using cipher block chaining encryption.

24. The method of provisioning an access card of an access control system of claim 23, further comprising generating, using the at least one key generation algorithm and based on the UID of the access card, an initialization vector, wherein the encrypting the operation key further comprises using the initialization vector with the cipher block chaining encryption.

25. The method of provisioning an access card of an access control system of claim 22, wherein the generating the replacement key comprises generating the replacement key further based on an embedded key that is embedded in firmware of an access card reader.

26. The method of provisioning an access card of an access control system of claim 22, wherein the generating the encryption key comprises generating the encryption key further based on an embedded key that is embedded in firmware of an access card reader.

27. The method of provisioning an access card of an access control system of claim 22, wherein the generating the operation key further comprises generating the operation key further based on at least one of a plurality of predetermined characters or a manufacturing code.

28. The method of provisioning an access card of an access control system of claim 27, wherein:
a first plurality of bytes of the operation key are based on a first portion of the UID of the access card;
a second plurality of bytes of the operation key are based on a second portion of the UID of the access card; and
the generating the operation key comprises arranging, in the operation key, the first plurality of bytes non-sequentially relative to the second plurality of bytes.

29. The method of provisioning an access card of an access control system of claim 28, wherein:
a third plurality of bytes of the operation key are based on the predetermined characters or a portion of the manufacturing code; and
the generating the operation key further comprises arranging, in the operation key, the third plurality of bytes in between the first plurality of bytes of the operation key and the second plurality of bytes of the operation key.

30. An access card reader of an access control system, the access card reader comprising:
one or more processors;
at least one key generation algorithm; and
memory storing instructions that, when executed by the one or more processors, cause the access card reader to:
detect an access card, wherein the access card comprises:
a plurality of memory sectors and a plurality of keys, wherein read access to each memory sector of the plurality of memory sectors is controlled by a corresponding key of the plurality of keys,
wherein the plurality of memory sectors comprise:
a first memory sector storing a unique identifier (UID) of the access card; and
a second memory sector storing an encrypted operation key that is based on the UID of the access card; and
wherein the plurality of keys comprises:
a first key that controls read access to the first memory sector; and
a second key that controls read access to the second memory sector and that is based on the UID of the access card;
based on detection of the access card:
read, from the access card, the UID of the access card;
generate, using the at least one key generation algorithm and based on the UID of the access card, the second key of the plurality of keys;
read, from the access card and using the second key, the encrypted operation key;
generate, using the at least one key generation algorithm and based on the UID of the access card, a decryption key;
decrypt, using the decryption key, the encrypted operation key to obtain a decrypted operation key;
validate the decrypted operation key; and
based on successful validation of the decrypted operation key, provide, to an access control device, an indication of granted access.

31. The access card reader of an access control system of claim 30, wherein the operation key is further based on at least one of a plurality of predetermined characters or a manufacturing code.

32. The access card reader of an access control system of claim 31, wherein:
a first plurality of bytes of the operation key are based on a first portion of the UID of the access card;
a second plurality of bytes of the operation key are based on a second portion of the UID of the access card; and
the first plurality of bytes are arranged, in the operation key, non-sequentially relative to the second plurality of bytes.

33. The access card reader of an access control system of claim 32, wherein:
a third plurality of bytes of the operation key are based on the predetermined characters or a portion of the manufacturing code; and
the third plurality of bytes is arranged, in the operation key, in between the first plurality of bytes of the operation key and the second plurality of bytes of the operation key.

34. The access card reader of an access control system of claim 30, wherein the instructions, when executed by the one or more processors, cause the access card reader to validate the decrypted operation key at least by validating a format of the decrypted operation key.

35. The access card reader of an access control system of claim 30, further comprising an embedded key that is embedded in firmware of the access card reader, wherein the instructions, when executed by the one or more processors, cause the access card reader to generate the decryption key further based on the embedded key.

36. The access card reader of an access control system of claim 30, wherein the instructions, when executed by the one or more processors, cause the access card reader to decrypt the encrypted operation key at least by using cipher block chaining decryption.

37. The access card reader of an access control system of claim 36, wherein:
the instructions, when executed by the one or more processors, further cause the access card reader to generate, using the at least one key generation algorithm and based on the UID of the access card, an initialization vector; and
the instructions, when executed by the one or more processors, cause the access card reader to decrypt the encrypted operation key at least by using the initialization vector with the cipher block chaining decryption.

38. The access card reader of an access control system of claim 30, wherein the instructions, when executed by the one or more processors, cause the access card reader to generate the second key further based on an embedded key that is embedded in firmware of the access card reader.

39. The access card reader of an access control system of claim 30, wherein the access card reader is a contactless access card reader.

40. The access card reader of an access control system of claim 30, wherein the access card reader is configured to read the access card from a distance of no more than about 2-3 millimeters.

41. An access card of an access control system, the access card comprising:
a first memory sector of a plurality of memory sectors of the access card, wherein the first memory sector stores a unique identifier (UID) of the access card;

a second memory sector of the plurality of memory sectors of the access card, wherein the second memory sector stores an encrypted operation key that is based on the UID of the access card;

a first key that controls read access to the first memory sector;

a second key that controls read access to the second memory sector, wherein the second key is based on the UID of the access card; and circuitry that configures the access card to:

based on receiving, from an access card reader after the access card reader detects the access card, a first signal that indicates the first key, provide, to the access card reader, the UID of the access card; and based on receiving, from the access card reader after the access card reader receives the UID of the access card, a second signal that indicates the second key, provide, to the access card reader, the encrypted operation key, wherein the second key is generated by the access card reader using at least one key generation algorithm and based on the UID of the access card.

42. The access card of the access control system of claim 41, wherein the circuitry further configures the access card to:

receive the second key; and replace, at the access card, a default key that controls read access to the second memory sector with the second key.

43. The access card of the access control system of claim 41, wherein the circuitry further configures the access card to:

receive the encrypted operation key; and store, in the second memory sector, the encrypted operation key.

44. The access card of the access control system of claim 41, wherein the encrypted operation key is further based on at least one of a plurality of predetermined characters or a manufacturing code.

45. The access card of the access control system of claim 41, wherein the second key is further based on an embedded key that is embedded in firmware of the access card reader.

46. The access card of the access control system of claim 41, wherein the access card is configured to be read by the access card reader from a distance of no more than about 2-3 millimeters.

47. The access card of the access control system of claim 41, wherein the encrypted operation key stored at the access card corresponds to an operation key that is based on at least one of a plurality of predetermined characters or a manufacturing code.

48. The access card of the access control system of claim 47, wherein the operation key, corresponding to the encrypted operation key stored at the access card, comprises:

a first plurality of bytes that are based on a first portion of the UID of the access card;

a second plurality of bytes that are based on a second portion of the UID of the access card; and wherein the first plurality of bytes are arranged, in the operation key, non-sequentially relative to the second plurality of bytes.

49. The access card of claim 48, wherein the operation key, corresponding to the encrypted operation key stored at the access card, further comprises:

a third plurality of bytes that are based on the predetermined characters or at least a portion of the manufacturing code; and wherein the third plurality of bytes is arranged, in the operation key, in between the first plurality of bytes of the operation key and the second plurality of bytes of the operation key.

* * * * *